United States Patent [19]

White

[11] Patent Number: 4,473,764

[45] Date of Patent: Sep. 25, 1984

[54] DYNAMOELECTRIC MACHINE

[75] Inventor: Robert W. White, DeKalb, Ill.

[73] Assignee: General Electric Company, Fort Wayne, Ind.

[21] Appl. No.: 402,320

[22] Filed: Jul. 27, 1982

[51] Int. Cl.³ .............................................. H02K 5/00
[52] U.S. Cl. ....................................... 310/91; 310/42; 310/89; 310/254
[58] Field of Search ........................ 310/89, 90, 91, 42, 310/217, 254, 258; 228/135; 29/596, 513

[56] References Cited

U.S. PATENT DOCUMENTS

| | | | |
|---|---|---|---|
| 654,042 | 7/1900 | Young | 228/135 |
| 2,974,856 | 3/1961 | Seely | 310/66 UX |
| 3,164,422 | 1/1965 | Shaffer | 308/132 |
| 3,270,223 | 8/1966 | Seely | 310/62 |
| 3,858,067 | 12/1974 | Otto | 310/42 |
| 4,318,218 | 3/1982 | Nelson | 310/258 |

FOREIGN PATENT DOCUMENTS 156130 5/1939 Fed. Rep. of Germany ...... 403/242

Primary Examiner—R. Skudy
Attorney, Agent, or Firm—Joseph E. Papin

[57] ABSTRACT

A dynamoelectric machine has a pair of opposite end frames with a pair of sets of apertures extending therethrough, respectively. A set of beams includes a pair of opposite end portions and a pair of sets of tabs on the opposite end portions of the beams which extend at least in part through the aperture sets in the end frames, the tabs being sized predeterminately smaller than the apertures and predeterminately arranged generally in spaced apart relation from said apertures therewithin, respectively. A pair of sets of welds interconnect the end frames at least adjacent the apertures therein with at least a part of each of the tabs extending at least in part through the apertures in the spaced apart relation therefrom, respectively.

8 Claims, 6 Drawing Figures

DYNAMOELECTRIC MACHINE

CROSS-REFERENCE TO RELATED APPLICATION

This application is related to the commonly assigned copending Charles W. Otto patent application Ser. No. 377,554 filed May 12, 1982 entitled "Dynamoelectric Machine And Methods" which is incorporated herein by reference and also to the commonly assigned Robert W. White and Frank R. Kuzan application Ser. No. 402,282 filed July 27, 1982 concurrently herewith and entitled "Methods And Apparatus For Assembling A Dynamoelectric Machine".

FIELD OF THE INVENTION

This invention relates in general to electrical apparatus and in particular to an improved dynamoelectric machine.

BACKGROUND OF THE INVENTION

In general, dynamoelectric machines, such as electric motors, are basically categorized as being of three different types of construction, i.e., a totally enclosed motor, a drip-proof motor and an open motor. One definition of a totally enclosed motor is that it is so enclosed as to prevent the free exchange of air between the inside and the outside of the motor housing but not sufficiently enclosed to be air tight, and an example of such totally enclosed motor is illustrated in U.S. Pat. No. 2,974,856 issued to R. E. Seely on Mar. 14, 1961. A definition of an open motor is that it has ventilating openings which permit passage of external cooling air over and around the windings of such open motor, and examples of such open motor are illustrated in U.S. Pat. No. 3,164,422 issued Jan. 5, 1965 to Paul B. Shaffer et al. and U.S. Pat. No. 3,858,067 issued Dec. 31, 1974 to Charles W. Otto. One definition of a drip-proof motor is that it is an open motor in which the ventilation openings are so constructed that successful operation is not interfered with when drops of liquid or solid particles strike or enter the housing thereof at any angle from about 0° to about 15° downward from the vertical, and an example of such drip-proof motor is illustrated in U.S. Pat. No. 3,270,223 issued Aug. 30, 1966 to R. E. Seely. The foregoing definitions of totally enclosed, drip proof and open motors may be found in the C. G. Veinott textbook entitled "Fractional and Subfractional Horsepower Electric Motors" (third edition, McGraw-Hill Book Co.).

Further, with respect to the open motor construction of the aforementioned U.S. Pat. No. 3,858,067, a plurality of beams secured to a stator had a pair of opposite end portions received within a plurality of sockets provided in a pair of opposite end frames, respectively. In order to secure the opposite end frames against displacement from the opposite end portions of the beams, metallic plugs were solidified and contained generally within the sockets and were respectively interconnected between the opposite end portions of the beams and at least a portion of the sockets.

In U.S. Pat. No. 3,164,422, the open motor construction shown therein included a stator having four circumferentially spaced apart welding surfaces on the periphery thereof, and a pair of opposite end frames were positioned adjacent opposite sides or faces of the stator, respectively. Four spaced apart flanges integrally formed on the opposite end frames extended axially therefrom so as to be arranged generally in aligned relation with each other and in overlaying relation with the four peripheral welding surfaces on the stator, respectively. In order to secure the stator and opposite end frames together against displacement, the four flanges of the opposite end frames were spot welded to the four peripheral welding surfaces on the stator, respectively.

SUMMARY OF THE INVENTION

Among the several objects of the present invention may be noted the provision of an improved dynamoelectric machine wherein a stator supports a set of beams respectively welded at the opposite ends thereof to a pair of end frames; the provision of such dynamoelectric machine wherein the welds are predeterminately spaced from the stator to obviate the possibility of introducing thereinto radial stresses sufficient to produce a nonuniform air gap between the stator and a rotor rotatable therein and journaled by two end frames; the provision of such dynamoelectric machine in which tabs on the opposite ends of the beams are received at least in part within apertures in the opposite end frame in predetermined spaced relation from sidewalls of the apertures, respectively; the provision of such improved dynamoelectric machine wherein the predetermined spacing of the tabs from the sidewalls of end frame apertures in which the tabs are received is effective to assure proper alignment of the components of the dynamoelectric machine and maintain a predetermined air gap between a bore of the stator and a rotatable assembly disposed in the bore and journaled in the end frames; the provision of such improved dynamoelectric machine in which the welds interconnect between the end frames at least adjacent the sidewalls of the apertures therein with at least a part of each of the tabs received in the apertures, respectively; and the provision of such improved dynamoelectric machine which is simplistic in design, easily assembled and economically manufactured. These as well as other objects and advantageous features of the present invention will be in part apparent and in part pointed out hereinafter.

In general and in one form of the invention, a dynamoelectric machine has a pair of opposite end frames with a pair of sets of apertures in the end frames including a pair of sets of sidewalls extending through the end frames, respectively. A set of beams a pair of opposite end portions and a pair of sets of tabs on the opposite end portions of the beams which extend at least in part through the apertures in the end frames, the tabs being sized predeterminately smaller than the apertures and predeterminately arranged generally in spaced apart relation with the sidewalls of the apertures therewithin, respectively. A pair of sets of welds interconnect the end frames at least adjacent the apertures therein with at least a part of each of the tabs extending at least in part through the apertures and maintain the tabs in the spaced relation thereof with the sidewalls of the apertures, respectively.

BRIEF DESCRIPTION OF THE DRAWINGS

Corresponding reference characters indicate corresponding parts throughout the several views of the drawings.

The exemplifications set out herein illustrate the preferred embodiments of the invention in one form thereof, and such exemplifications are not to be construed as limiting in any manner the scope of the invention.

DETAILED DESCRIPTION OF THE PREFERRED EMBODIMENTS

Figure 1:
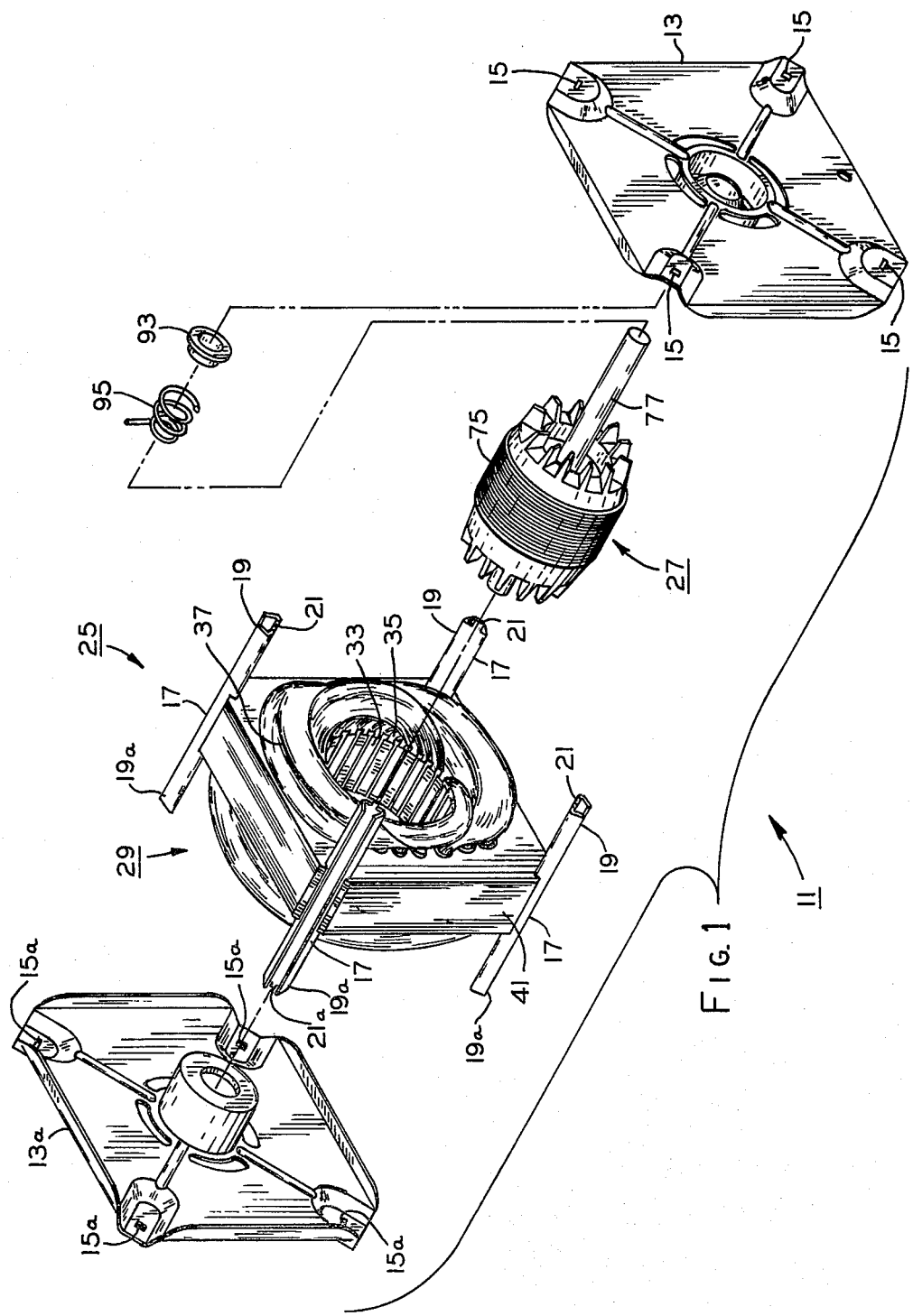
FIG. 1 is an exploded perspectively view of a dynamoelectric machine in one form of the invention.
Figure 2:
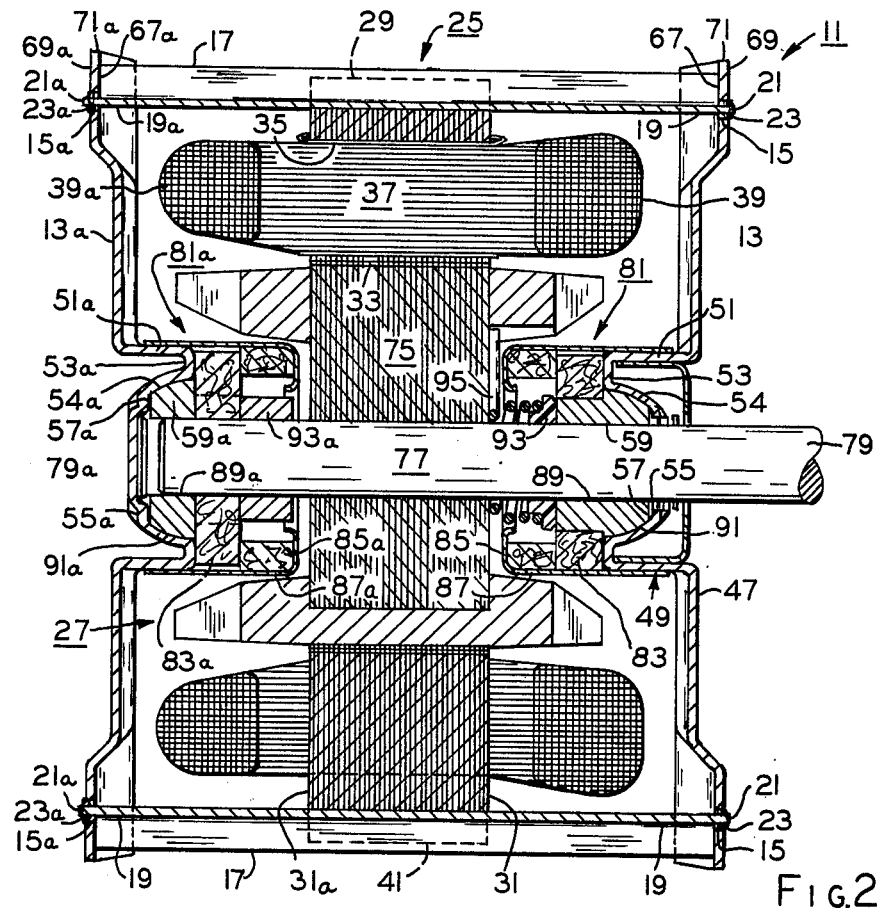
FIG. 2 is an enlarged sectional view showing the dynamoelectric machine of FIG. 1 in cross section.
Figure 3:
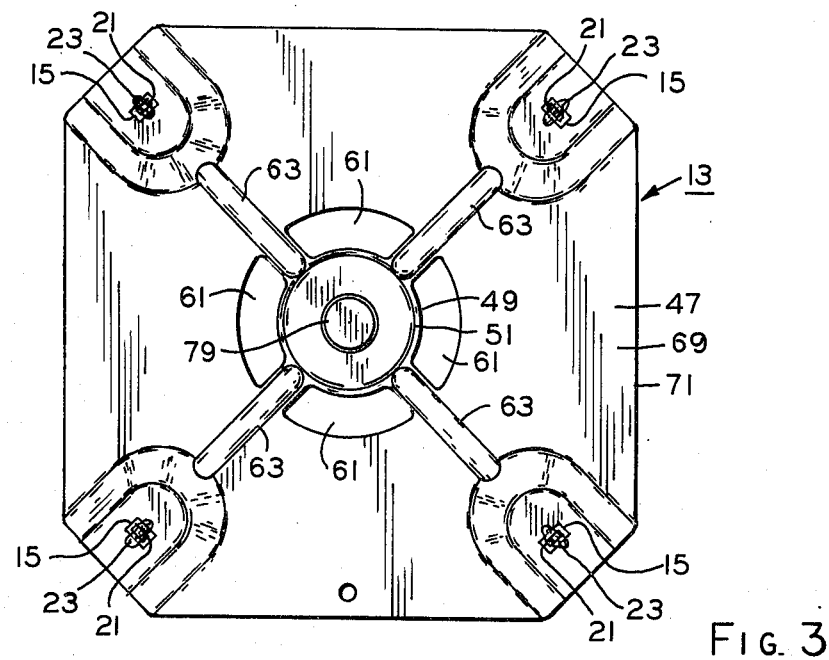
FIG. 3 is a right side elevational view of the dynamoelectric machine of FIG. 2.
Figure 4:
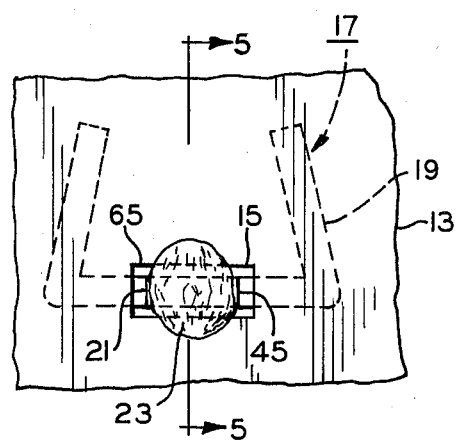
FIG. 4 is an enlarged partial view taken from FIG. 3 illustrating the predetermined spaced apart relation between a sidewall of an aperture in an end frame of the dynamoelectric machine and a tab on a beam carried by a stator of the dynamoelectric machine and received in such aperture and also illustrating a welded interconnection between such tab and such end shield.
Figure 5:
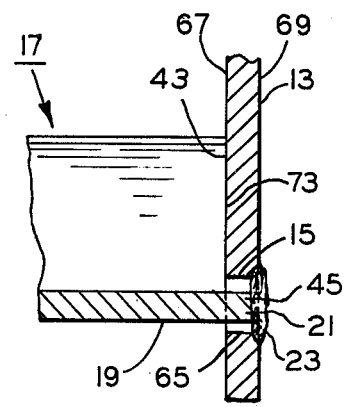
FIG. 5 is a sectional view taken along line 5—5 in FIG. 4.

With reference to the drawings in general, there is illustrated in one form of the invention a dynamoelectric machine 11 having a pair of opposite end frames 13, 13a with a pair of sets of apertures 15, 15a extending therethrough, respectively (FIGS. 1 and 2). A set of beams 17 includes a pair of opposite end portions 19, 19a and a pair of sets of tabs 21, 21a on the opposite end portion of the beams which extend at least in part through aperture sets 15, 15a in end frames 13, 13a, the tabs being sized predeterminately smaller than the apertures and predeterminately arranged generally in spaced apart relation from the apertures therewithin, respectively (FIGS. 1 and 3-5). A pair of sets of welds 23, 23a interconnect end frames 13, 13a at least adjacent apertures 15, 15a therein with at least a part of each of tabs 21, 21a received in the apertures in the spaced apart relation therefrom, respectively (FIGS. 4 and 5).

More particularly and with specific reference to FIG. 1, dynamoelectric machine or electric motor 11 has a stationary assembly 25 and a rotatable assembly 27 associated therewith. Stationary assembly 25 comprises a ferromagnetic core or stator 29 having a pair of generally opposite ends or end faces 31, 31a which are respectively intersected by a bore 33 extending generally axially through the stator. A plurality of generally radially disposed winding means accommodating slots 35 are also provided in stator 29 respectively intersecting with both stator bore 33 and stator end faces 31, 31a. Winding means 37, such as a plurality of conductor turns or coils thereof, is disposed in slot plurality 35 having suitable insulation therebetween, and the winding means has a pair of opposite, generally annular groupings of end turns 39, 39a thereof disposed generally about stator bore 33 adjacent stator end faces 31, 31a, respectively.

Beams 17 are associated or otherwise fixedly secured to stator 29 at least generally adjacent a peripheral surface 41 thereof, and if a more detailed discussion of the construction and securement of the beams to the stator is desired, reference may be had to U.S. Pat. No. 3,858,067 issued Dec. 31, 1974 to Charles W. Otto which is incorporated herein by reference. Opposite end portions 19, 19a of beams 17 includes means, such as end or abutment surfaces 43, 43a or the like for instance, which are adapted for seating or abutting engagement with end frames 13, 13a, respectively, as discussed in greater detail hereinafter. Tabs or reduced extensions 21, 21a extend generally axially from abutment surfaces 43, 43a on opposite end portions 19, 19a of beams 17 and have opposite facing free ends 45, 45a spaced from the abutment surfaces, respectively. While the configuration of beams 17 as well as their securement to stator 29 are illustrated herein for purposes of disclosure, it is contemplated that other beams of different constructions and configurations and secured in different manners to a stator may be utilized within the scope of the invention so as to meet at least some of the objects thereof.

Since end frames 13, 13a are shown herein for purposes of disclosure as being generally of like construction, only end frame 13 will be further described in detail hereinafter with like parts of end frame 13a being further designated by the letter "a" for the sake of brevity of disclosure. End frame 13 is lanced or otherwise stamped or formed from a metallic sheet material, such as sheet steel or the like for instance, and it is contemplated that such forming of the end frame may be effected by the use of progressive dies or the like for instance (not shown). A generally planar section 47 of end frame 13 is formed so as to extend about a generally central portion of the end frame which includes a hub or recessed portion 49 integral with the end frame. Hub portion 49 has a generally cylindric axially extending sidewall 51 and a base wall 53 which is integral with the sidewall of the hub portion, and a shaft receiving opening 52 is provided through the base wall. While base wall 53a of end frame 13a is illustrated herein as being closed, it is contemplated that a shaft receiving opening similar to opening 52 in end frame 13 may be provided in base wall 53a of end frame 13a within the scope of the invention so as to meet al least some of the aspects thereof. Base wall 53 defines a partial spherical bearing seating surface 54 having at least one key 55 deformed therefrom for at least limited rotational preventing engagement with a keyway 57 provided on a bearing 59 of the self-aligning type, as discussed in greater detail hereinafter.

A plurality of ventilation openings 61 are provided through planar section 47 of end frame 13 about hub portion 49 thereof, and the planar section may have a plurality of radially extending ribs 63 or the like deformed therefrom for end frame strengthening purposes if desired. As best seen in FIGS. 3-5, apertures or generally elongate slots 15 each have a sidewall 65 extending between opposite faces 67, 69 of end frame 13, and the apertures are arranged in preselected locations generally radially outwardly of hub portion 49 and generally adjacent a peripheral marginal or circumferential portion 71 of the end frame. A set of seats 73 are provided on opposite face 67 of end frame 13 at least generally adjacent the intersection therewith of aperture sidewalls 65 for engagement with abutment surfaces 43 of beams 17, as discussed in greater detail hereinafter. While the construction and configuration of end frames 13, 13a are described and illustrated herein for purposes of disclosure, it is, of course, contemplated that other end frames having different constructions and configurations as well as being formed in different manners and of different materials may be utilized within the scope of the invention so as to meet at least some of the objects thereof.

In a preferred aspect of the invention, abutment surfaces 43, 43a on opposite end portions 19, 19a of beams 17 are seated in abutting engagement with seats 73, 73a on faces 67, 67a of end frames 13, 13a, and tabs 21, 21a of the beams extend from the beam abutment surfaces at least in part through apertures 15, 15a in the end frames with free ends 45, 45a of the tabs being disposed at least adjacent faces 69, 69a of the end frames, respectively. As previously mentioned, tabs 21, 21a on beams 17 are sized predeterminately smaller than apertures 15, 15a in end frames 13, 13a, respectively; therefore, it may be noted that the tabs, i.e., the peripheral or circumferential surfaces thereof, are predeterminately arranged in spaced apart relation from sidewalls 65, 65a of the apertures, respectively. Further, welds 23, 23a span across the aforementioned spaces between tabs 21, 21a and sidewalls 65, 65a of apertures 15, 15a thereby to interconnect end frames 13, 13a at least adjacent the sidewalls of the apertures in displacement preventing engagement with at least free ends 45, 45a of the tabs in their spaced apart relation from the apertures therewithin, respectively.

The above description of the preferred aspect of the invention assumes that end frames 13, 13a are perfectly planar, i.e., unwarped or unbent, so that abutment surfaces 43, 43a on opposite end portions 19, 19a of beams 17 are all seated in abutting engagement with seats 73, 73a on faces 67, 67a of the end frames, respectively. However, due to improper manufacturing techniques, thermal shrinkage and/or expansion of the metal from which end frames 13, 13a are formed and/or improper handling of the end frames during the manufacturing process, at least planar sections 47, 47a or portions of the end frames may be warped or otherwise bent. Therefore, in the event of the occurrence of such warping or bending in end frames 13, 13a, at least one of beams 17 may have the abutment surface 43 thereof seated against at least one of seats 73 on end face 67 of end frame 13, and at least two of the beams have the abutment surfaces 43a thereof seated against at least two of seats 73a on end face 67a of end frame 13a. Thus, it may be noted that the maintenance of the predetermined spaced relation between tabs 21, 21a on beams and sidewalls 65, 65a of apertures 15, 15a in end frames 13, 13a not only assures proper alignment of the end frames with other components of stationary assembly 25 by accommodating any warpage which may occur in the end frames but also is effective to at least in part assure proper alignment of rotatable assembly 27 with respect to the stationary assembly, as discussed in greater detail hereinafter. Further, it may also be noted that welds 23, 23a are made generally at opposite end portions 19, 19a of beams 17 with the welds being predeterminately spaced away from stator 29; therefore, the possibility of introducing radial stresses sufficient to produce a nonuniform air gap between bore 33 of the stator and rotatable assembly 27 is obviated since the heat of the welds is not transmitted directly to the stator.

Rotatable assembly 27 comprises a rotor 75 which is mounted on a shaft 77 so as to conjointly rotate therewith, and although the rotor is illustrated herein for purposes of disclosure as being of the squirrel cage type, it is contemplated that other types of rotors, such as for instance a permanent magnet rotor or the like, may be utilized within the scope of the invention so as to meet at least some of the objects thereof. Rotor 75 is rotatably disposed within bore 33 of stator 29 with a generally uniform air gap therebetween and is arranged in magnetic coupling relation with winding means 37 of the stator upon the excitation thereof when dynamoelectric machine 11 is energized across a power source (not shown). Pairs of opposite end portions 79, 79a are provided on shaft 77 with opposite end portion 79 extending through opening 52 in end frame 13 and are associated with a pair of lubrication and bearing systems 81, 81a which are supported by end frames 13, 13a, respectively; and since lubrication and bearing systems 81, 81a are generally of like construction, only lubrication and bearing system 81 will be discussed in detail with corresponding components of lubrication and bearing system 81a being designated by the letter "a".

Lubrication and bearing system 81 comprises bearing 59, a lubricant feeder wick device 83, a lubricant storage wicking material 85, and means, such as for instance a cover or container 87 or the like for containing at least the lubricant storage wicking material. A shaft receiving or journaling bore 89 extends generally axially through bearing 59 which is of the self-aligning type having a partial spherical bearing surface 91 seated in self-aligning bearing relation with bearing seating surface 54 on base wall 53 of end frame 13. Keyway 57 of bearing 59 is provided in an end thereof adjacent bearing surface 91 and is arranged in at least limited anti-rotational engagement with key 55 of bearing seating surface 54 on end frame 13. While the engagement of key and keyway 55, 57 does provide at least limited anti-rotational seating of bearing 59 on seating surface 54 therefor, such engagement of the key and keyway does permit a desirable amount of self-aligning movement of partial spherical bearing surface 91 of bearing 59 on seat 54 therefor of end frame 13. It may be noted that the aforementioned predetermined spaced relation between tabs 21, 21a on beams 17 and sidewalls 65, 65a of apertures 15, 15a in end frames 13, 13a is instrumental in ensuring sufficient self-alignment of bearings 59, 59a associated with the end frames and journaling shaft 77 so as to assure the uniformity of the air gap between stator bore 33 and rotor 75 as well as the free rotation of rotatable assembly 27 in stationary assembly 25.

Feeder wick 83 is associated with bearings 59 so as to be in lubricant wiping engagement with a part of shaft end portion 79 journaled in bore 89 of the bearing and in lubricant transfer engagement with lubricant storage wicking material 85. Feeder wick 83 may be formed of a suitable composition or material, such as felt or the like for instance, and lubricant storage wicking material 85 may be formed of any suitable material, such as for instance an absorbent wool or "GE Lube" available from the General Electric Company, Fort Wayne, Ind. Bearing 59, feeder wick 83 and lubricant storage wicking material 85 are disposed within container 87 which is an open-ended cup-shaped member, such as a sleeve or the like for instance, having an end thereof secured by suitable means about hub portion 49 of end frame 13. To complete the description of dynamoelectric machine 11, a pair of thrust devices 93, 93a are arranged on opposite end portions 79, 79a of shaft 77 for thrust taking engagement with bearings 59, 59a, and the compressive force of a spring 95 on shaft 77 biased between rotor 75 and thrust device 93 is effective to urge the thrust devices toward the thrust taking engagement with the bearings. If a more detailed discussion of the construction and operation of lubrication and bearing systems 81, 81a for dynamoelectric machine 11 is desired, reference may be had to the aforementioned Charles W. Otto patent application Ser. No. 377,554 filed May 12, 1982. Further, while lubrication and bearing systems 81, 81a are shown herein for purposes of disclosure, it is contemplated that other lubrications and bearing systems of different construction and operation may be utilized within the scope of the invention so as to meet at least some of the objects thereof.

Figure 6:
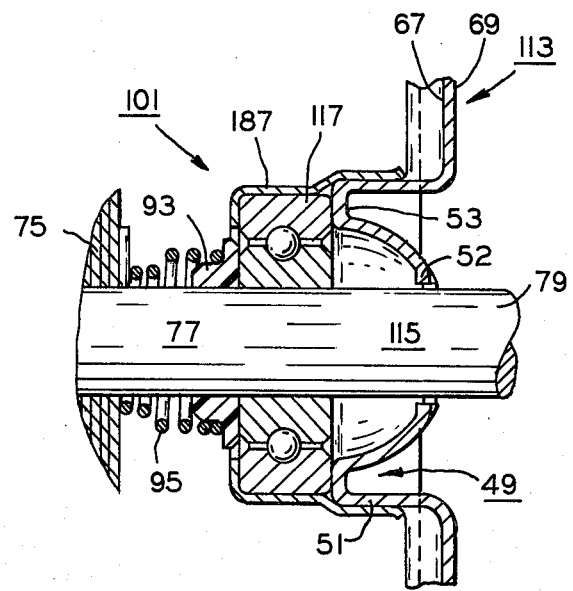
FIG. 6 is a partial sectional view illustrating an alternative bearing construction for the dynamoelectric machine of FIG. 1 associated with the end frame thereof.

With reference to FIG. 6, an alternative lubrication and bearing system 101 is illustrated for use in dynamoelectric machine 11 in one form of the invention which has generally the same component parts functioning generally in the same manner as discussed above with the exceptions noted hereinafter.

End frame 113 may, if desired, be the same as end frame 13, and a sealed bearing, such as ball bearing 115 has an outer race 117 received in rotation preventing engagement within a container 187 and an inner race received about shaft end portion 79 so as to be generally conjointly rotatable with shaft 77 upon the energization of dynamoelectric machine 11. In this embodiment, container 187 is generally the same as container 87 except that container 187 is stepped, and bearing outer race 117 is axially abutted between a part of end wall 53 on hub portion 49 of end frame 113 and an end flange of container 187 opposite end wall 53. Albeit not shown for purposes of brevity, it is contemplated that dynamoelectric machine may be provided with a like end frame opposite end 113 which also includes a like sealed bearing associated in the same manner with shaft end portion 79a, and thrust devices 93, 93a may be associated in the same manner with the inner races of the inner races of the sealed bearings in the opposite end frames.

From the foregoing, it is now apparent that a novel dynamoelectric machine 11 has been presented meeting the objects set out hereinbefore, as well as others, and that changes as to the precise arrangements, shapes, details and connections of the components utilized in such dynamoelectric machine may be made by those having ordinary skill in the art without departing from the spirit of the invention or the scope thereof as set out in the claims which follow.

What I claim as new and desire to secure by Letters Patent of the United States is:

1. A dynamoelectric machine comprising:
   first and second opposite end frames each having a circumferential portion and a generally central portion;
   an opening through said central portion of at least one of said first and second end frames;
   first and second sets of apertures in said first and second end frames and located in preselected locations generally adjacent said circumferential portions of said first and second end frames, respectively, and said apertures including sidewalls on said first and second opposite end frames and extending generally axially therethrough, respectively;
   a stator disposed generally in axially spaced relation between said first and second end frames and including a generally axial bore therethrough, and a plurality of winding receiving slots arranged generally about said bore;
   winding means received in said slots of said stator and extending generally about said bore thereof;
   a set of beams secured to said stator and including first and second opposite abutment surfaces, respectively, said first abutment surface of at least one of said beams being disposed in abutting engagement with said first end frame and said second abutment surface of at least two of said beams being disposed in abutting engagement with said second end frame, first and second sets of opposite tabs integrally formed on said first and second opposite abutment surfaces of said beams and extending generally axially therefrom at least in part through said first and second apertures in said first and second end frames, said tabs being sized predeterminately smaller than said apertures and predeterminately arranged generally in radially spaced apart relation from said sidewalls of said apertures, respectively;
   first and second sets of welds interconnecting said first and second end frames at least adjacent said first and second apertures therein with at least a part of each of said first and second tabs extending at least in part through said first and second apertures in the radially spaced apart relation with said sidewalls thereof, respectively;
   a rotatable assembly including a shaft having first and second opposite shaft extensions, and a rotor disposed at least in part within said bore of said stator and secured to said shaft between said first and second shaft extensions; and
   first and second bearing means associated with said first and second end frames at least generally adjacent said central portions thereof for journaling said first and second shaft extensions, respectively, one of said first and second bearing means extending generally about said opening through said central portion of said at least one of said first and second end shields with one of said first and second shaft extensions extending generally axially through said opening.

2. A dynamoelectric machine comprising:
   a pair of opposite end frames;
   a pair of sets of apertures in said end frames and with said apertures having a sidewall extending generally axially through said end frames, respectively;
   a stator having a generally axial bore extending therethrough and disposed between said end frames;
   winding means associated with said stator and extending generally about said bore;
   a set of beams secured to said stator and including a pair of opposite end portions, respectively, one of said opposite end portions of at least one of said beams being seated against one of said end frames and the other of said opposite end portions of at least two of said beams being seated against the other of said end frames, and a pair of sets of generally axially and oppositely disposed tabs on said opposite end portions of said beams and extending at least in part through said apertures in said end frames and predeterminately arranged in generally radially spaced apart relation from said sidewalls of said apertures, respectively;
   a pair of sets of welds interconnecting said end frames at least adjacent said apertures therein with at least a part of each of said tabs extending at least in part through said apertures and maintaining the generally radially spaced apart relation between said tabs and said sidewalls of said apertures, respectively;
   a rotor disposed at least in part within said bore of said stator;
   a shaft secured to said rotor; and
   a pair of bearing means associated with said end frames for journaling said shaft, respectively.

3. A dynamoelectric machine comprising:
   a pair of opposite end frames;

a pair of sets of apertures in said end frames and including a pair of sets of sidewalls extending through said end frames, respectively;

a set of beams including a pair of opposite end portions, respectively, and a pair of sets of tabs on said opposite end portions of said beams and extending at least in part through said apertures in said end frames, said tabs being sized predeterminately smaller than said apertures and predeterminately arranged in spaced apart relation with said sidewalls of said apertures, respectively; and a pair of sets of welds interconnecting said end frames at least adjacent said apertures therein with at least a part of each of said tabs extending at least in part through said apertures and maintaining said tabs in the spaced apart relation thereof with said sidewalls of said apertures, respectively.

4. A dynamoelectric machine as set forth in claim 3 wherein said beams further include a pair of opposite abutment surfaces on said opposite end portions thereof, one of said opposite abutment surfaces of at least one of said beams being engaged with one of said end frames and the other of said opposite abutment surfaces of at least two of said beams being engaged with the other of said end frames.

5. A dynamoelectric machine as set forth in claim 3 wherein said welds span across the spaces between said tabs and said sidewalls of said apertures to effect the interconnection of said end frames with said tabs, respectively.

6. A dynamoelectric machine as set forth in claim 3 further comprising a stator disposed between said end frames with said beams being secured to said stator, respectively.

7. A dynamoelectric machine as set forth in claim 6 further comprising a rotatable assembly associated with said stator, and a pair of bearing means associated with said end frames for journaling said rotatable assembly, respectively.

8. A dynamoelectric machine comprising:

at least one end frame having a pair of opposite faces;

at least one aperture in said at least one end frame with said at least one aperture having a sidewall on said at least one end frame and intersecting with said opposite faces of said at least one end frame, respectively;

at least one beam supporting said at least one end frame in the dynamoelectric machine and including at least one abutment surface disposed in abutting engagement with one of said opposite faces of said at least one end frame at least adjacent the intersection of said sidewall of said at least one aperture with said one opposite face of said at least one end frame, a tab integral with said at least one abutment surface of said at least one beam and extending generally axially therefrom at least in part through said at least one aperture in said at least one end frame, a free end on said at least one tab and spaced adjacent the other of said opposite faces of said at least one end frame, said at least one tab being sized predeterminately smaller than said at least one aperture thereby to predeterminately define a space extending generally radially between said sidewall of said at least one tab; and weld means spanning across at least a part of the space between said sidewall of said at least one aperture and said at least one tab for interconnecting said at least one end frame at least adjacent the intersection of said sidewall of said at least one aperture and said other face of said at least one end frame with at least said free end of said at least one tab and for maintaining the space between said at least part of said at least one tab and said sidewall of said at least one aperture.

* * * * *